3,296,315
PREPARATION OF HYDROXY NITROPHENYL COMPOUNDS

Horst G. Adolph and Joseph C. Dacons, Silver Spring, Md., and Mortimer J. Kamlet, London, England, assignors to the United States of America as represented by the Secretary of the Navy
No Drawing. Filed May 2, 1963, Ser. No. 277,984
4 Claims. (Cl. 260—620)

The invention described herein may be manufactured and used by or for the Government of the United States of America for governmental purposes without the payment of any royalties thereon or therefor.

This invention relates generally to the conversion of methyl trinitrophenyl compounds to the corresponding hydroxy trinitrophenyl derivatives and, in particular, to the preparation of 3,3'-dihydroxy-2,2',4,4',6,6'-hexanitrobiphenyl from 3,3'-dimethyl-2,2',4,4',6,6'-hexanitrobiphenyl.

It has been found that a specific class of alkyl aromatic nitro compounds undergoes oxidation to yield the corresponding hydroxy aromatic nitro derivatives under special circumstances.

Accordingly, an object of this invention is to prepare hydroxy trinitrophenyl derivatives of methyl trinitrophenyl compounds by oxidation of the latter in the presence of an alkali metal dichromate, sulfuric acid and nitric acid.

A further object of the invention is to prepare 3,3'-dihydroxy-2,2',4,4',6,6'-hexanitrobiphenyl.

The process of this invention comprises the addition of nitric acid, with stirring, to the appropriate methyl trinitrophenyl compound followed by the subsequent, separate additions of sulfuric acid and sodium dichromate.

The following example illustrates a specific embodiment of the invention.

EXAMPLE

*Preparation of 3,3'-dihydroxy-2,2',4,4',6,6'-hexanitrobiphenyl*

To 260 grams of finely powdered 3,3'-dimethyl-2,2',4,4',6,6'-hexanitrobiphenyl in a 5 liter, three necked flask, provided with a stirrer and thermometer, was added 2,600 milliliters of 90% to 100% nitric acid with stirring. A sufficient amount of the total of 905 milliliters of 30% oleum was then added to raise the temperature of the reaction to about 50° C. Upon dissolution of all, or at least the major portion of the starting material, the remaining oleum was added while cooling the reaction mixture with an ice bath.

To the well stirred reaction mixture, 750 grams of sodium dichromate-dihydrate was added gradually at a temperature of about 25° C. The mixture was cooled for the first three to four hours and was then left at room temperature (no supervision necessary). Total stirring time was about twenty-five hours.

The crude 3,3'-dihydroxy-2,2',4,4',6,6'-hexanitrobiphenyl was dissolved by drowning the reaction mixture on cracked ice followed by filtration through a coarse filter. The filter cake was twice washed with 20% HCl. The product was then twice dissolved in ethanol and filtered and the filtrates were combined and acidified with HCl until the suspension appeared to be almost colorless. After standing for about two hours, the product was filtered and the filtrate dissolved in acetone. Addition of benzene caused separation of the lower aqueous phase. The organic phase was dried and concentrated until the product started crystallizing. After cooling, the product was again filtered, washed with benzene and hexane and dried for twenty-four hours in a vacuum oven at 50 to 60° C. There was obtained 208 grams (79%) of 3,3'-dihydroxy-2,2',4,4',6,6'-hexanitrobiphenyl having a melting point of 311° C.

In the same manner, as illustrated in the above specific embodiment, trinitrotoluene was converted to picric acid, 3-bromo-2,4,6-trinitrotoluene was converted to bromo-picric acid, 2,4,6-trinitro-m-cresol was converted to 2,4,6-trinitroresorcinol and 3-methyl-2,2',4,4',6,6'-hexanitrobiphenyl was converted to 3-hydroxy-2,2',4,4',6,6'-hexanitrobiphenyl.

The general method of the invention for the conversion of methyl trinitrophenyl compounds to the corresponding hydroxy trinitrophenyl derivatives is critical in regard to the following factors:

(1) The higher homologs of the methyl trinitrophenyl compounds will not be converted by the instant reaction to the corresponding hydroxy compounds. For example, 1-ethyl-2,4,6-trinitrobenzene and 1-butyl-2,4,6-trinitrobenzene are not converted to the corresponding hydroxy compounds by the process of this invention. Also, methyl dinitrophenyl compounds are converted to the corresponding substituted benzoic acids instead of to the hydroxy derivatives. It is thus seen that the method of this invention is specific to methyl trinitrophenyl compounds.

(2) The absence of any one of sulfuric acid, nitric acid or the alkali metal dichromate will result in no reaction. That is, the hydroxy compound will not be obtained. The absence of nitric acid will, for example, lead to the production of carboxylic acids rather than hydroxy derivatives.

(3) Compounds similar to the dichromate such as, for example, the alkali metal permanganates and the alkali metal chlorates are not effective substitutes for the chromate.

On the other hand, the nitric acid: sulfuric acid ratio may be varied over a wide range such as, for example, from 1:3 to 30:1. Also, it has been found that in lieu of sodium dichromate, other alkali metal dichromates may be used such as, for example, potassium dichromate. Perchloric acid may be substituted for sulfuric acid in the reaction mixture. Moreover, it has been found that the sequence of reactant addition is not critical, except in regard to optimum yields, and that either the sulfuric acid or dichromate may be added as initial reactants. In fact an admixture of nitric and sulfuric acids may be used as initial reactants or the admixture may be added to an admixture of the starting material and the dichromate. Preferably, however, the nitric acid is added first since this particular mode of the process initiates optimum yields.

Obviously many modifications and variations of the present invention are possible in the light of the above teachings. It is therefore to be understood, that within the scope of the appended claims the invention may be practiced otherwise than as specifically described.

What is claimed is:

1. Process for the conversion of methyl trinitrophenyl compounds to the corresponding hydroxy trinitrophenyl compounds wherein said methyl trinitrophenyl compound is selected from the group consisting of 3,3'-dimethyl-2,2',4,4',6,6'-hexanitrobiphenyl, trinitrotoluene, 3-bromo-2,4,6-trinitrotoluene, 2,4,6-trinitro-m-cresol and 3-methyl-2,2',4,4',6,6'-hexanitrobiphenyl comprising the oxidation of said methyl trinitrophenyl compounds in the presence of sulfuric acid, nitric acid and an alkali metal dichromate.

2. Process of claim 1 wherein the nitric acid: sulfuric acid ratio is in the range of about 1:3 to about 30:1.

3. Process of claim 1 wherein said dichromate is sodium dichromate.

4. Process of claim 1 wherein said dichromate is potassium dichromate.

No references cited.

LEON ZITVER, *Primary Examiner.*

W. B. LONE, *Assistant Examiner.*